United States Patent [19]
Tsuchida et al.

[11] 4,122,243
[45] Oct. 24, 1978

[54] SEALED ALKALINE BATTERY

[75] Inventors: Takashi Tsuchida, Oksai; Kenichi Shinoda, Toyohashi; Noriaki Sakamoto, Shizuoka, all of Japan

[73] Assignee: Fuji Electrochemical Co., Ltd., Tokyo, Japan

[21] Appl. No.: 802,196

[22] Filed: May 31, 1977

[30] Foreign Application Priority Data

Feb. 10, 1977 [JP] Japan .................................. 52-12990

[51] Int. Cl.² .............................................. H01M 2/04
[52] U.S. Cl. .................................................... 429/174
[58] Field of Search ................................ 429/174, 185

[56] References Cited

U.S. PATENT DOCUMENTS

| 3,064,065 | 11/1962 | Belove | 429/185 |
| 3,131,337 | 4/1964 | Clement | 429/185 |
| 3,380,857 | 4/1968 | Bilhorn | 429/174 |

*Primary Examiner*—Donald L. Walton
*Attorney, Agent, or Firm*—Wenderoth, Lind & Ponack

[57] ABSTRACT

In an alkaline battery hermetically sealed by fusion of an insulator containing silicon oxide such as glass interposed between an annular metal cover electrically connected to one electrode of the battery and a metal member connected to the other electrode of the battery, an annular packing is disposed inside the annular metal cover in abutment therewith, and a metal collector plate is connected to the metal member and disposed below the insulator. The peripheral edge of the metal collector plate is tightly held against the inner periphery of the packing to define a closed space between the insulator and the collector plate.

6 Claims, 2 Drawing Figures

SEALED ALKALINE BATTERY

BACKGROUND OF THE INVENTION

This invention relates to an alkaline battery and more particularly to a sealing structure thereof in which an insulator such as glass or ceramic is integrally joined by fusion thereof to both metal members, one being electrically connected to an anode of the battery and the other being electrically connected to a cathode of the battery.

Such a sealing structure has improved sealing effects with high resistance against thermal shock by using selected materials which have desired coefficients of thermal expansion. However, when the fusion seals of the glass or ceramic utilized in the field of electronic industry are applied as they are, without any special considerations, to the sealing structure of an alkaline battery, several problems will be encountered due to electrochemical reactions of the alkaline electrolyte with the glass or ceramic.

Now, reference is made to the problems caused by fusion seal using glass. The first of the problems is that the glass is partially dissolved and molten into the alkaline electrolyte due to the electrochemical reactions. That is, as the alkaline electrolyte normally contains sodium hydroxide or potassium hydroxide, the glass surface contacting the electrolyte is gradually converted to sodium silicate or potassium silicate. Although the sealing glass generally employed is borosilicate glass, which has considerably higher insolubility against the aqueous solution of alkaline than the ordinary silicate glass, the sealing glass is partially dissolved by and molten into the alkaline electrolyte over a long period of time because the concentration of the sodium or potassium hydroxide in the electrolyte of the alkaline battery is high and usually in the range of 25 to 45 percents.

To prevent such dissolution, it is effective to add sodium silicate, potassium silicate or zinc oxide to the electrolyte such that the additive comes close to the saturation point thereof. However, such addition of sodium silicate or the like cannot completely prevent the dissolution of the glass.

In addition to the dissolution of silicon oxide into the electrolyte, there is another problem such that the glass surface contacting the alkaline electrolyte is converted to a solid phase of sodium silicate or potassium silicate, which forms an extraneous film distinct from glass. While the thickness of the film gradually increases, cracks are developed inside the film and, sometimes, the inner cracks reach the inner layer of glass to deteriorate the sealing effect of the glass.

Still another problem has been experienced at the area of fusion sealing between the glass and metal. The fusion seal of the glass and the metal is established through a thin layer of glass, in the range of 10 to 15 microns in thickness from the interface between the glass and the metal, in which the oxide of the metal or iron has been dissolved and diffused. This thin layer of glass containing the oxide of the metal is subjected to a severe electrochemical corrosion by the alkaline electrolyte, so that the alkaline electrolyte may leak out of the battery through the interface between the corroded glass and the metal in a compartively short period of time. This electrochemical corrosion will be considerably accelerated when the metal adjoining the thin layer of glass is in contact with the anode of the battery. For example, in case of a silver oxide battery wherein zinc oxide, silver oxide and potassium hydroxide are used as the anode, cathode and electrolyte, respectively, it could be noted that a short-circuit is formed in the battery with the zinc being an anode, the thin glass layer adjoining the metal surface electrically connected to the zinc being a cathode and potassium hydroxide being an electrolyte. In the thin glass layer acting as the cathode, the iron oxide is reduced on discharge, thus causing the electrochemical corrosion to proceed. The concentration of iron oxide in the thin glass layer increases toward the metal surface, so that a higher corrosion rate prevails in the vicinity of the metal surface and the leakage of the electrolyte takes place in this area at rather early times.

When the glass is directly exposed to the outside of the battery, a further problem has been experienced other than a cracking of the glass taken place due to impact, e.g. upon dropping of the battery. The water vapor in the atmosphere condenses on the glass surface to dissolve and melt out the sodium, potassium or the like from the glass, thus sometimes developing an ionically conductive liquid film. In such a case, a leakage current flows through the liquid film, thereby causing a self-discharge of the battery while in stock.

BRIEF SUMMARY OF THE INVENTION

Accordingly, an object of the present invention is to provide an alkaline battery sealed by fusion of an insulator containing silicon oxide such as glass or ceramic wherein the inner surface of the insulator is effectively spaced from an alkaline electrolyte in the battery to prevent direct contact therewith.

Another object of the present invention is to provide an alkaline battery sealed by fusion of an insulator containing silicon oxide wherein the sealing effect of the insulator is maintained without being electrochemically reacted with an alkaline electrolyte in the battery.

Still another object of the present invention is to provide an alkaline battery sealed by fusion of an insulator containing silicon oxide which has an improved impact resistance against external forces and excellent discharge characteristics.

According to the present invention, a sealed alkaline battery comprises a metal case connected to one electrode of the battery, an annular metal cover connected to an open edge of the metal case, a metal member connected to the other electrode of the battery, and an insulator containing silicon oxide therein and joined by fusion thereof to the annular metal cover and the metal chamber. The improvement of the present battery further comprises an annular packing disposed inside the annular metal cover in abutment therewith, and a metal collector plate connected to the metal member and disposed below the insulator in such a manner that the peripheral edge of the metal collector plate is tightly held against the inner periphery of the packing to define a closed space between the insulator and the collector plate.

Preferably, the insulator is formed in the shape of a collar and is disposed at the inner peripheral edge of the annular metal cover. The metal member is a rod extending through the axial center part of the collar-shaped insulator.

The metal collector plate may be formed in the shape of a dish, the peripheral edge of which is sharpened and pressed into the packing.

Other objects and features of the present invention will become apparent from the following description of preferred embodiments thereof when taken in conjunction with the accompanying drawings, in which

DETAILED DESCRIPTION OF THE INVENTION

Figure 1:
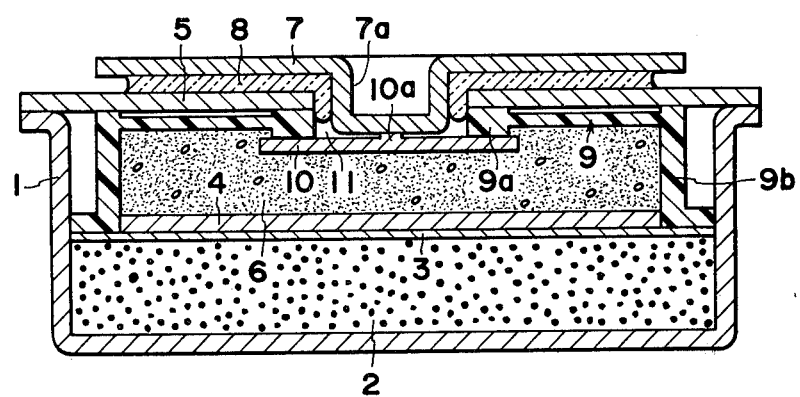
FIG. 1 is a vertical sectional view showing an alkaline battery according to a first embodiment of the present invention.

Referring to a first embodiment of the present invention, a silver oxide battery is shown in FIG. 1 which has a metal case 1 containing therein a cathode composition 2 of silver oxide and graphite and serving as the cathode terminal of the battery. Disposed in turn upon the cathode composition 2 are a separator layer 3 such as cellophane film for preventing migration of silver ions and an electrolyte-retaining layer 4, such as cotton layer, impregnated with an alkaline electrolyte having an aqueous solution of the potassium hydroxide saturated with zinc oxide. Superimposed on and covering the open edge of the cathode metal case 1 is an annular metal plate 5, the peripheral edge of which is integrally joined by electric welding to the open edge of the metal case 1. Filled within a space above the electrolyte-retaining layer 4 is an anode composition 6 comprising a mixture of amalgamated zinc powder, potassium hydroxide, zinc oxide, carboxymethyl-cellulose and water. The central opening of the annular metal plate 5 is hermetically sealed by the sealing structure of the present invention.

According to the sealing structure of the present invention shown in FIG. 1, an anode terminal metal plate 7 having a concave 7a at the center part thereof is disposed upon the annular metal plate 5 in such a manner that the center concave 7a of the anode terminal plate 7 projects through the central opening of the annular metal plate 5. The anode terminal plate 7 and the annular metal plate 5 are joined and sealed by fusion of glass layer 8 provided at the interspace therebetween. Disposed inside of the annular metal plate 5 and around the anode composition 6 is a compressible electrically insulative packing 9 having an annular rim 9a defining an upper center opening which is registered with the central opening of the annular metal plate 5. A disc-shaped collector plate 10 has a projection 10a at the upper center thereof, which is welded to the bottom center of the concave 7a of the anode terminal plate 7, and is compressed at the circumferential portion thereof against the annular rim 9a of the packing 9. Thus, a free space 11 is formed below the inner end of the glass layer 8 between the lower circumferential portions of the concave 7a of the terminal plate 7, the inner circumference of the rim 9a of the packing 9 and the upper surface of the collector plate 10.

In the process of assembly of the sealing structure of the present battery shown in FIG. 1, the annular metal plate 5 is first joined to the anode terminal plate 7 by fusion of glass 8 provided at the interspace therebetween. Then, the insulative packing 9 is disposed below the annular metal plate 5 with the center opening defined by the annular rim 9a being registered with the central opening of the plate. Thereafter, the upper circumferential surface of collector plate 10 is pressed against the annular rim 9a of the packing 9 and the projection 10a is spot-welded to the concave 7a of the anode terminal plate 7. To construct the battery by using the sealing structure thus formed as set forth above, the anode composition 6 is filled within the space defined by the packing 9 and the collector plate 10 and is covered with the electrolyte-retaining layer 4. Apart from the anode side of the battery, the cathode composition 2 is provided under pressure in the metal case 1 and covered with the separator layer 3. Then, the circumferential portion of the annular metal plate 5 is superimposed upon the upper circumferential edge of the metal case and electrically welded with each other at these circumferences. At this time of assembly, the annular flange 9b at the lower end of the packing is so formed as to press the circumferential face of the separator layer 3.

As will be apparent from the description set forth above and FIG. 1, the anode composition 6 is separated from the upper portion of the cathode metal case 1 and the annular metal plate 5 through the electrically insulative packing 9, while the anode terminal plate 7 is electrically connected to the anode composition 6 by the collector plate 10. In such a sealing structure of the alkaline battery, the free space 11 is formed below the inner end of the glass layer 8 and above the collector 10 which is pressed against the compressible electrically insulative packing at the circumferential portion thereof. Accordingly, the alkaline electrolyte in the anode composition 6 cannot directly contact the glass layer 8 and, even if the alkaline electrolyte enters into the space 11 through the circumferential portion of the collector plate 10 compressed against the packing 9, the amount of the alkaline electrolyte in the space is very small, so that the several drawbacks of the prior art caused by direct contact of the electrolyte with the glass are eliminated and improved in the present invention.

Figure 2:
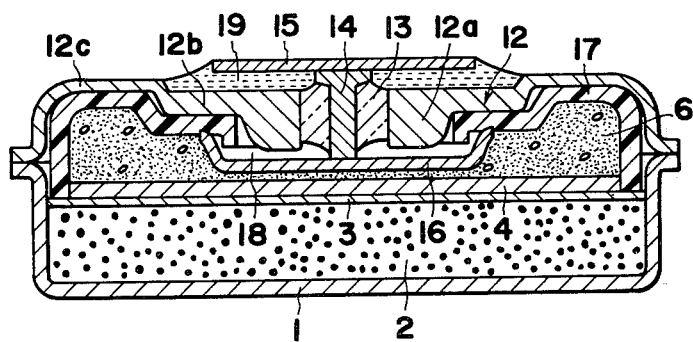
FIG. 2 is a vertical sectional view showing an alkaline battery according to a second embodiment of the present invention.

Now, reference is made in detail to a second embodiment of the present invention shown in FIG. 2. A battery shown in FIG. 2 is a silver oxide battery approximately 11.5mm in diameter and 4.0mm high. In place of the annular metal plate 5 in the first embodiment, the cathode metal case 1 is covered with a center-opened cap-shaped metal ring member 12, the center opening of which is hermetically sealed by the sealing structure of the second embodiment.

In the sealing structure of the second embodiment, the ring member 12 has a thick center annular portion 12a defining the center opening therein, an intermediate portion 12b and a thin circumferential portion 12c welded at the outer end thereof to the open end of the metal case 1, these portions 12a–12c being integral with each other. An insulative collar 13 made of glass is disposed inside the center opening of the ring member 12 and has a metal collector rod 14 therethrough. This glass collar 13 is joined by fusion thereof to the center opening of the metal ring member 12 and also to the metal collector rod 14, thereby providing an integral assembly of the metal ring member 12, glass collar 13 and the metal collector rod 14. The upper end of the metal collector rod 14 projects beyond the glass collar 13 and a disc-shaped anode terminal plate 15 is electrically welded to the upper end of the rod 14. Preferably, the terminal plate 15 is made of stainless steel, or an iron plated with nickel or gold in the thickness of 3 to 30 microns. The lower end of the metal collector rod 14 projects beyond the lower end of the glass collar and a dish-shaped collector 16 is electrically welded to the lower end of the rod 14. Preferably, the collector plate 16 is plated with a metal to be easily amalgamated, such as tin, gold, silver copper or the like, in the form of a film of 3 to 30 microns thick. Disposed inside of the metal ring member 12 is a center-opened cap-shaped packing 17 which is made of thermoplastic, compressible, elastic and electrically insulative material such as nylon, polyethylene, polypropylene or the like. The periphery of the dish-shaped collector plate 16, which is preferably sharpened, is pressed against and embedded into the packing 17. Thus, a closed space 18 is formed below the glass collar 13 by the dish-shaped collector plate 16. Filled in a clearance below the anode terminal plate 15 and above the glass collar 13 is an elastic insulative material 19 such as a curable material, e.g. epoxy resin, silicone rubber or the like, paraffin, wax or a thermoplastic resin such as ethylene-vinyl acetate copolymer.

The process of assembly of the battery having the structure set forth above will be described hereinafter. For the integral joining of the glass collar 13 to the metal ring member 12 and metal collector rod 14 by fusion of the glass, there are available two methods, i.e., compression-type and matching-type methods. In the compression-type method, the glass collar 13 and the metal collector rod 14 are formed from such materials that have substantially the same coefficient of thermal expansion. On the other hand, the metal ring member 12, which is to adjoin the outer periphery of the glass collar 13, is formed of such material that has a higher coefficient of thermal expansion. In this scheme, after applying a heat high enough to fuse the glass, the metal ring member 12 surrounding the glass collar 13 compresses the latter against the metal rod 14 in the cooling process following the heating process due to the difference of the coefficients of thermal expansion, so that the glass collar is integrally joined by fusion to the metal ring member and the metal rod.

A specific example of the compression-type method will be given below. As the collector metal rod 14, there is used a rod of Kovar alloy having a composition of 20Ni-17Co-Fe or 50Ni-Fe alloy, which is plated with nickel to a thickness of 5 to 30 microns and has a coefficient of linear expansion of about $47.8 \times 10^{-7}/°$ C. The metal ring member 12 is made of iron plated by nickel to a thickness of 3 to 30 microns and has a coefficient of linear expansion of about $118 \times 10^{-7}/°$ C. which is higher than that of the collector metal rod 14. The glass collar 13 is made of borosilicate glass powder which is molded in the form of collar and then sintered. The glass has a coefficient of linear expansion of about $58.0 \times 10^{-7}/°$ C. which is approximately equal to that of the metal rod 14. Then, the metal collector rod 14 is snugly inserted into an axial bore of the glass collar 13 which in turn is held in the center opening of the metal ring member 12. A heat is applied to a temperature of about 1000° C. to partially fuse the glass collar 13. In the cooling process following this thermal fusion, the glass collar 13 is integrally joined to the metal rod 14 and the metal ring member 12 due to the high contractile force of the metal ring member 12 having a higher coefficient of linear expansion.

Other than the above examples, the metal collector rod may be a Koval alloy not plated with nickel or a Koval alloy treated with acid, decarbonized and surface-oxidized in the air at a temperature of about 800° C. to form an oxide surface film containing iron oxides therein. As other practical materials for the collector metal rod, the alloys, such as 42Ni-6Cr-Fe, 42Ni-Fe, 50Ni-Fe, 18Cr-Fe and 55Ni-Cu, may be employed with surface treatment, i.e., metal-plating or oxidation.

In the matching-type method, the metal ring member 12 and the metal collector rod 14 are made of materials which have coefficients of linear expansion close to the coefficient of linear expansion of the glass collar 13. In this instance, both the metal ring member 12 and the metal collector rod 14 are made of the materials mentioned hereinbefore in connection with the metal collector rod.

Preferably, the anode terminal plate 15 is welded to the upper end of the metal collector rod 14 prior to the aforementioned joining of the glass collar 13 to the metal ring member 12 and the metal collector rod 14. Upon welding the dish-shaped collector plate 16 to the lower end of the metal collector rod 14, the insulative packing 17 is previously positioned in abuttment with the inner surface of the metal ring member 12. In this case, an adhesive agent of rubber or epoxy type may be interposed therebetween so as to bond the insulative packing to the inner face of the metal ring member 12. While the collector plate 16 is electrically welded to the lower end of the rod 14, the peripheral edge of the collector plate 16 is partially forced into the insulative packing 17 by pressing the former against the periphery of the center opening of the latter.

After the terminal plate 15 and collector plate 16 have been welded to the upper and lower ends, respectively, of the metal collector rod 14 in the above manner, the elastic insulative material 19 is filled into the clearance between the terminal plate 15 and the upper face of the glass collar 13. Then, the anode composition 6 is filled into the cavity defined by the cap-shaped packing 17 and the dish-shaped collector plate 16, followed by the placement of the electrolyte-retaining layer 4 across its opening. Thereafter, the lower peripheral edge of the metal ring member 12 is superimposed on and electrically welded to the upper peripheral edge at the open end of the cathode metal case 1 in which the cathode composition 2 and the separator layer 3 have been previously encased. To improve resistance against the oxidation, i.e., rust-proofness, of the welding portions at the peripheral edges of the ring member 12 and the metal case 1, these peripheral edges may be pre-plated with nickel in a sufficient thickness. However, it is preferable for a further improvement to incorporate a small amount of phosphorus, for example by electroless nickel plating.

The dimensions of the cap-shaped packing 17 are so selected that the lower end thereof is pressed against the circumferential margin of the separator layer 3 at the time of welding of the metal ring member to the metal case 1. Preferably, this pressure is made in the range of 5 to 50kg/cm² and applied flexibly for a long period of time. Such a construction of the packing 17 is preferable especially when a cathode composition slightly soluble in the alkaline electrolyte is employed like a silver oxide battery. That is, in a battery of this type, it is necessary to provide a separator layer which will prevent migration of silver irons from the cathode composition into the anode composition, since, if the silver ions thus released are permitted to enter the anode composition easily, the cathode composition will undergo a gradual attrition to ultimately bring about a substantial reduction in capacity of the battery. In this embodiment, the lower end of the insulative packing 17 is tightly abutted against the circumferential margin of the separator layer 3, so that the migration of silver ions into the anode composition along the peripheral margin of the separator layer is effectively prevented.

As it will be understood from the disclosure set forth above, according to the present sealed alkaline battery shown in FIGS. 1 and 2, the creeping passage of the alkaline electrolyte is blocked at two stages, the first being the peripheral edge of the collector plate 10 or 16 pressed against the packing 9 or 17, and the second being the sealing glass 8 or 13 joined by fusion to the annular metal cover 5 or 12 and the metal member 7 or 14 connected to the collector plate. The closed space 11 or 18 formed between the glass and the collector plate precludes a direct contact of the alkaline electrolyte with the glass, thereby preventing the dissolution of the silicon oxide contained in the glass into the alkaline electrolyte and the formation of the aforementioned film on the glass surface which could lead to cracks in the glass. Also, by virtue of the closed space 11 or 18, the glass layer adjoining the metal member 7 or 14 is not directly corroded by the alkaline electrolyte, thus ensuring an improved resistance to leakage. In addition, even if the alkaline electrolyte creeps and enters into the space 11 or 18 through the compressed peripheral edge of the collector plate, not only the amount of electrolyte reaching into the space is extremely small but the arrival of the electrolyte to the glass surface due to a capillary action is retarded. Moreover, the provision of the space 11 or 18 results in better processing for the assembly of the battery, because it absorbs the expansion of air due to the heat generated in the welding of the collector plate 10 or 16 to the metal member 7 or 14.

In a prefered sealing structure in which the glass insulator is formed in the shape of a collar 13 and disposed at the inner peripheral edge of the annular metal cover 12 and the metal member is a rod 14 extending through the axial center part of the insulator, the amount of glass used for the sealing is smaller, thereby enhancing the sealing effect of the battery with reduced possibility that the glass is reacted with alkaline electrolyte. Also, the process for the assembly of the sealing structure of the present battery becomes easier.

Further, in a preferred sealing structure in which the metal collector plate 16 is formed in the shape of a dish, the peripheral edge of which is sharpened and pressed into the packing 17, the creeping passage of the alkaline electrolyte is effectively blocked at the periphery of the metal collector plate.

Moreover, in a preferred sealing structure in which the upper end of the rod 14 extends beyond the collar-shaped glass insulator 13 and an elastic insulative material 19 is filled into a clearance between the collar-shaped glass insulator 13 and a metal disc 15 welded to the upper end of the rod 14, the creeping passage of the alkaline electrolyte is further blocked by this insulative material 19. This insulative material 19 also serves to absorb any external force that may be imposed upon the metal disc, thus preventing cracking of the glass when, for example, the battery is dropped. In addition, since the insulative material shields the glass or the like from the ambient atmosphere, it precludes the self-discharge of the battery in stock which would otherwise be caused by the formation of an ionically conductive liquid film on the glass surface, thereby improving discharge characteristics of the battery.

Although the present invention has been described with reference to the preferred embodiments thereof, many modifications and alterations may be made within the spirit of the present invention. For example, the present invention may be applied to many kinds of alkaline batteries other than silver oxide batteries, such as mercury, alkaline manganese and nickel-cadmium batteries.

What is claimed is:

1. A sealed alkaline battery comprising:
   a metal case connected to one electrode of the battery;
   an annular metal cover connected to an open edge of said metal case;
   a metal member connected to the other electrode of the battery;
   an insulator containing silicon oxide therein and joined by fusion thereof to said annular metal cover and said metal member at the interspace therebetween;
   an annular packing disposed inside said annular metal cover in abutment therewith; and
   a dish-shaped metal collector plate connected to said metal member and disposed below said insulator in such a manner that the peripheral edge of said metal collector plate is pressed into the inner periphery of said packing to define a closed space between said insulator and said metal collector plate.

2. A sealed alkaline battery as claimed in claim 1, wherein said annular packing has an outer peripheral edge elastically pressed against the peripheral face of a separator provided between anode and cathode compositions of the battery.

3. A sealed alkaline battery as claimed in claim 1, wherein said insulator is formed in the shape of a collar disposed at the inner peripheral edge of said annular metal cover, and said metal member is a rod extending through the axial center part of said insulator.

4. A sealed alkaline battery as claimed in claim 3, wherein the upper end of said rod extends beyond said collar-shaped insulator and is welded with a metal disc, and an elastic insulative material is filled into a clearance between said collar-shaped insulator and said metal disc.

5. A sealed alkaline battery as claimed in claim 1, wherein the peripheral edge of said dish-shaped metal collector plate is sharpened.

6. A sealed alkaline battery as claimed in claim 1, wherein said insulator is a glass.

* * * * *